(No Model.)  3 Sheets—Sheet 1.

F. H. NORTON.
HARROW.

No. 546,549. Patented Sept. 17, 1895.

Witnesses:
L. C. Hills
J. B. Keefer

Inventor:
Frederick H. Norton.
by Marcellus Bailey
his Atty.

(No Model.) 3 Sheets—Sheet 2.

F. H. NORTON.
HARROW.

No. 546,549. Patented Sept. 17, 1895.

Witnesses:
L. C. Hills
F. B. Keefer

Inventor:
Frederick H. Norton,
by Marcellus Bailey
his Atty.

(No Model.) 3 Sheets—Sheet 3.
F. H. NORTON.
HARROW.
No. 546,549. Patented Sept. 17, 1895.

Witnesses:
L. C. Hills
J. B. Keifer

Inventor:
Fredk. H. Norton,
by Marcellus Bailey
his Atty.

UNITED STATES PATENT OFFICE.

FREDERICK H. NORTON, OF GOUVERNEUR, NEW YORK.

HARROW.

SPECIFICATION forming part of Letters Patent No. 546,549, dated September 17, 1895.

Application filed June 28, 1895. Serial No. 554,350. (No model.)

*To all whom it may concern:*

Be it known that I, FREDERICK H. NORTON, of Gouverneur, in the county of St. Lawrence and State of New York, have invented certain new and useful Improvements in Harrows, of which the following is a specification.

My invention relates to that kind of harrow known as a "disk harrow;" and it consists of certain improvements in the construction, arrangement, and combination of the parts of the harrow, which will first be described by reference to the accompanying drawings, and will then be more particularly pointed out in the claims.

Figure 1:
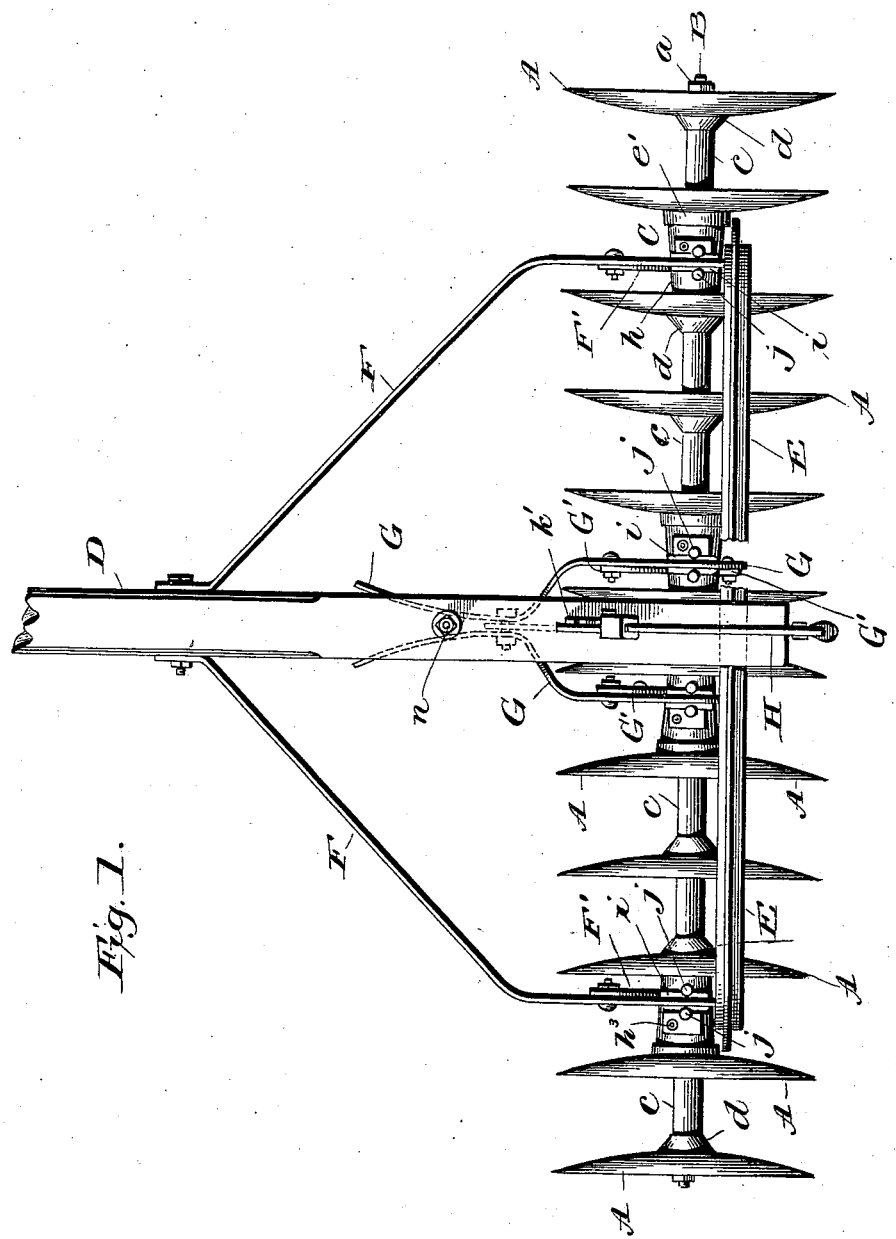
Figure 2:
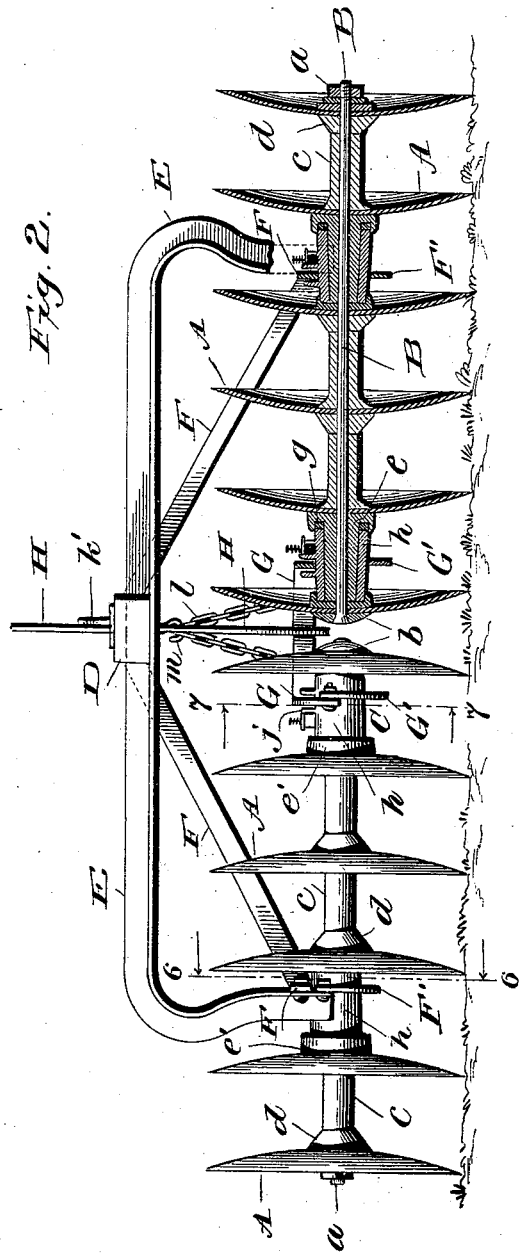
Figure 3:
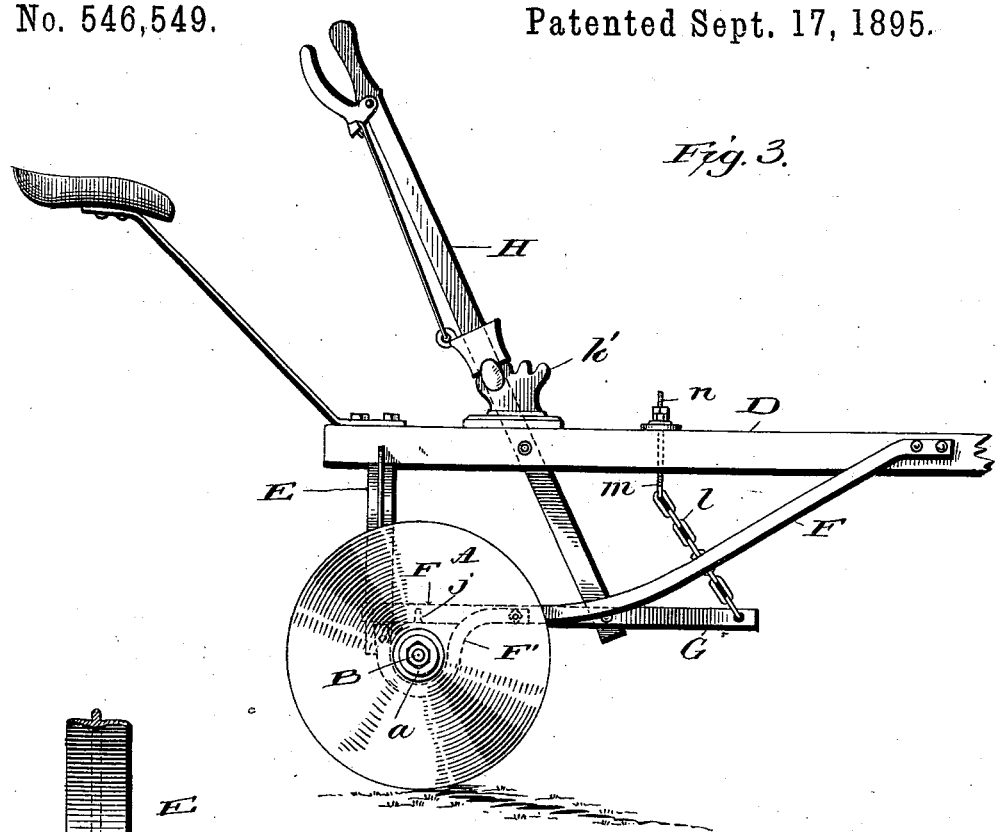
Figure 6:
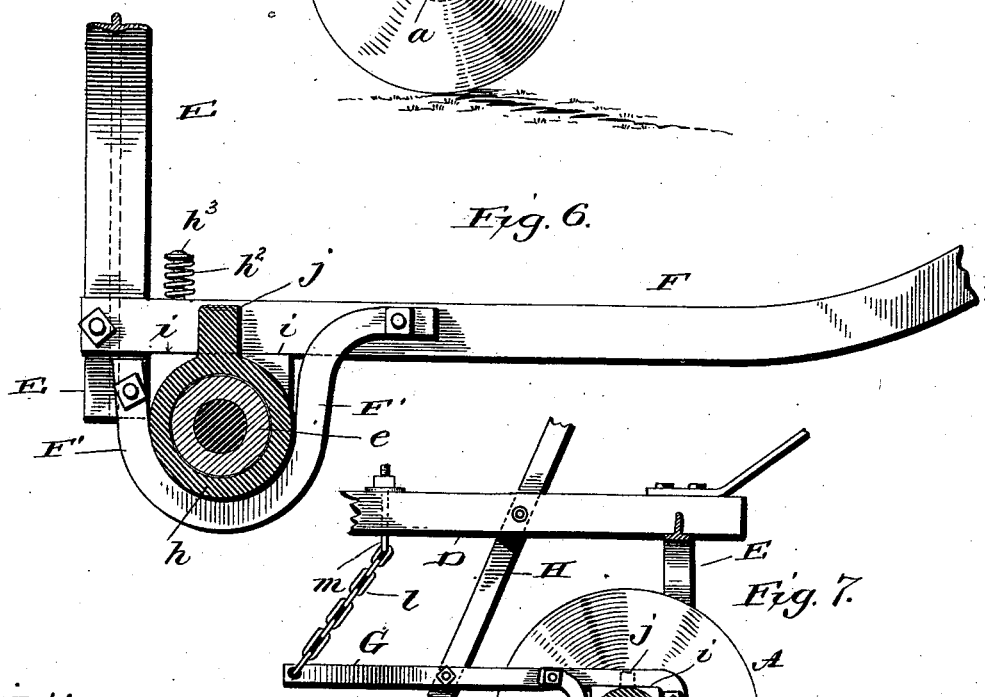
Figure 7:
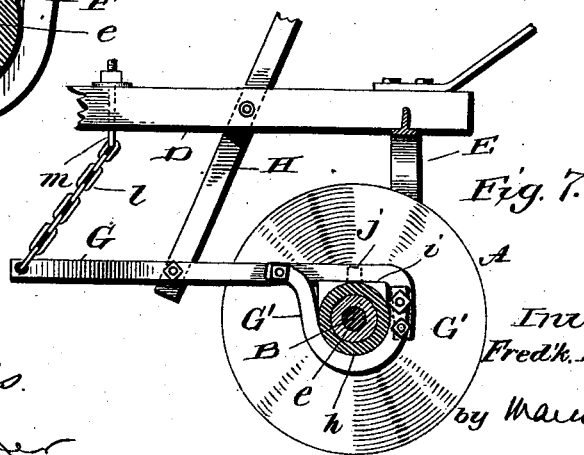

In the drawings, Figure 1 is a plan, Fig. 2 is a rear elevation, partly in vertical section, and Fig. 3 is a side elevation, of a disk harrow embodying my improvements. Fig. 4 is an enlarged longitudinal vertical section of one of the journal-boxes. Fig. 5 is a cross-section of the same on line 5 5, Fig. 4. Fig. 6 is a sectional detail on line 6 6, Fig. 2, showing the manner of joining the outer connecting or brace bars to the main beam and the journal-boxes. Fig. 7 is a sectional detail on line 7 7, Fig. 2, showing the manner of joining the inner connecting or brace bars to their journal-boxes.

The harrow shown in the drawings is one designed to act as an "outthrow" harrow or pulverizer. The disks A are divided into two gangs, each gang mounted upon its own axle B. The disks of each gang are fitted upon their axle B, which has a head $b$ at one end and is screw-threaded at the other end to receive a tightening-nut $a$. The disks are separated from one another by spacing-thimbles $c$ and washers $d$, except at the points where the journal-boxes are located, at which points I employ devices which will presently be described. By screwing up the nut $a$ all the parts will be held in place, and any suitable means may be employed to prevent the nut from working loose. At suitable points upon each axle are located the journal-boxes for the braces and connecting-bars, by which the axles, with their gangs of disks, are connected to the frame of the harrow. There are two boxes on each axle located at or near the opposite ends of said axle; and as all the boxes are alike a description of one will suffice for all.

C is the journal-box proper. It is mounted on a spool which fits on the axle and consists of two parts $e\, f$. The body part $e$ may be cylindrical, but preferably has the shape externally of the frustum of a cone, as shown, and is provided at its larger end with a cap or head $e'$. The part $f$ is a cap or head for the other end of the spool, but made separate therefrom, so that the journal-box may be slid upon the body of the spool. The box $h$ is placed loosely between the two caps $e'\, f$, and the latter are provided with a ring or sand-band to cover the adjoining end of the box and prevent dirt from working its way in. Within the cap $e'$ is a wearing-ring $g$, (preferably phosphor-bronze or brass,) which lies within the cap $e'$ around the spool and is interposed between the cap and the adjoining end of the journal-box to reduce the friction caused by endwise thrust with the oil-receptacle $h$ and axial passage for the spool $e$, cored out. The oil-box has a cap or cover $h'$, held by spring $h^2$ and pin $h^3$, as shown. On top the journal-box is formed with a flat bearing-surface $i$, extending crosswise thereof, and on opposite sides of this bearing-surface and about midway of its length are located two lugs $j$, between which extend the brace or connecting bars, hereinafter referred to. These lugs are rounded upon their interior opposite faces and are placed at such distance apart as to receive the brace or connecting bars and at the same time to permit the swinging of the inner ends of the axles in a horizontal plane without cramping or binding on said bars.

The draft-pole or tongue D of the harrow is carried by beam E, (preferably a steel beam of T cross-section,) having its ends bent downward to provide hangers or carriers for the outer journal-boxes. These ends, as shown, project downward at the rear and below the center of the journal-boxes, so as to take the draft strain. From the pole extend diagonally downward and outward braces or connecting-bars F, which at one end are attached to the pole and at the other end are attached to the respective ends of the arch-beam E at points above the tops of the outer journal-boxes on the two axles. These bars rest upon the journal-boxes and thus take the weight imposed upon the harrow by the weight of the driver, the seed-box and its contents, (if one should be employed,) or the heavy iron weights which at times are placed upon the beam E to cause the harrow to make a deeper cut. Straps or yokes F' are provided to prevent the bars F from lifting or rising away from the journal-boxes. These connecting-bars, together with the arch-beam E and the pole, form a firm, substantial, and strong frame substantially triangular both in plan and elevation.

The bars F extend between the lugs $j$ of the journal-boxes and rest upon the flat tops $i$ of the same. In this way good wearing-surfaces for carrying the load are provided and at the same time the boxes are prevented from rolling or turning with the axles. The inner brace or connecting bars are shown at G. The gang end of each bar G passes over the inner journal-box to which it pertains, extending between the two lugs $j$ and resting upon the flat top bearing-surface $i$ of that box and has its extreme rear end bent downward, so as to extend back and below the center of said journal-box, thus taking the draft strain. It is held loosely to the box by a yoke or strap G' passing beneath the box and secured at its ends to the bar G, as shown. The two bars G converge toward their front ends and are pinned to the lower end of an operating or adjusting lever H, pivoted in the pole and provided with the usual latch-lever and notched quadrant $k'$ for holding it in adjusted position. The joint between the operating-lever and the bars G is sufficiently loose to permit of all the needed play of the bar required for securing the desired adjustments. The bars are prolonged beyond or on front of the point where they are pinned to the operating-lever and at their extreme front ends are provided each with a chain $l$, the two chains at their upper ends being secured to a hook or eye-bolt $m$ in the pole, having an adjusting-nut $n$, by which it can be raised or permitted to drop, as desired. By means of the lever the inner ends of the axles can be swung outwardly and to the rear to the extent requisite to set the disks to give the desired outthrow, and by drawing up the bolt $m$ the chain $l$ can be drawn taut with the effect of holding down the inner ends of the gangs to their work. Under these conditions the bars are in effect levers, having their fulcrum at the point where they are pinned to the operating-lever H and connected at one end to the axles and at the other ends to the chains and their holding-bolt. On each axle I may so connect the journal-boxes by a thrust-bar extending between the same that the strain of any endwise thrust that may come upon either will be sustained by the other, also. This, however, is a nicety rather than a necessity.

Having described my improvements and the best way known to me of carrying the same into effect, what I claim herein as new and of my own invention is as follows:

1. In a disk harrow, the combination with the disk carrying axles, and journal boxes thereon, of a main beam provided with downwardly turned ends, which project below the center of the journal boxes and to the rear thereof, so as to take the draft strain, the pole, and brace or connecting bars extending across and resting upon the journal boxes to which they pertain, and secured at one end to the pole and at the other end to the downwardly extending ends of the main beam, substantially as and for the purposes hereinbefore set forth.

2. In a disk harrow, the combination with the disk carrying axles and supports for their outer ends, of journal boxes located at or near the inner ends of said axles, an operating lever pivoted in the pole or supporting frame of the harrow, and inner connecting or brace bars pinned to said lever and at their rear or gang ends passing over and loosely around said journal boxes, substantially as and for the purposes hereinbefore set forth.

3. In a disk harrow, the combination with the disk carrying axles, each provided at or near its two ends with journal boxes, of the pole the main beam provided with downwardly turned ends, extending down behind and below the center of the outer journal boxes, the outer brace bars attached at one end to the pole and thence extending outwardly and rearwardly over and resting upon and loosely connected with the outer journal boxes and secured to the downwardly turned end of the main beam, the operating lever, and the inner connecting or brace bars pinned to the operating lever and at their rear or gang ends passing over and loosely around the inner journal boxes, substantially as and for the purposes hereinbefore set forth.

4. In a disk harrow, the combination of the disk-carrying axle and disks thereon; the journal boxes provided on top with a flat bearing surface $i$ and two lugs $j$ one on each side of said surface; the main beam provided with downwardly turned ends which project below the center of the journal boxes and to the rear thereof; the pole; and the brace bars resting upon the flat bearing surface $i$ of the journal boxes and extending between the lugs $j$, and secured at one end to the pole and at the other end to the downwardly turned ends of the main beam, substantially as and for the purposes hereinbefore set forth.

In testimony whereof I have hereunto set my hand this 22d day of June, 1895.

FREDERICK H. NORTON.

Witnesses:
EDWIN DODGE,
EVANGELINE NORTON.